United States Patent
Sandöy et al.

(10) Patent No.: US 8,299,638 B2
(45) Date of Patent: Oct. 30, 2012

(54) PROPULSION SYSTEM FOR SHIPS

(75) Inventors: Normann Sandöy, Molde (NO); Reidar Vaardal, Freistiansund (NO)

(73) Assignee: Inpower AS, Kristiansund (NO)

( * ) Notice: Subject to any disclaimer, the term of this patent is extended or adjusted under 35 U.S.C. 154(b) by 424 days.

(21) Appl. No.: 10/566,574

(22) PCT Filed: Aug. 27, 2004

(86) PCT No.: PCT/NO2004/000253
§ 371 (c)(1),
(2), (4) Date: Feb. 16, 2006

(87) PCT Pub. No.: WO2005/025981
PCT Pub. Date: Mar. 24, 2005

(65) Prior Publication Data
US 2007/0293104 A1    Dec. 20, 2007

(30) Foreign Application Priority Data
Sep. 2, 2003   (NO) .................................. 20033876

(51) Int. Cl.
| | |
|---|---|
| B60L 11/02 | (2006.01) |
| B61C 9/38 | (2006.01) |
| F01C 13/00 | (2006.01) |
| F01D 15/10 | (2006.01) |
| F02C 6/00 | (2006.01) |
| F02D 25/00 | (2006.01) |
| F02D 29/06 | (2006.01) |
| H02P 9/04 | (2006.01) |

(52) U.S. Cl. .............................. 290/9; 290/4 R; 322/89
(58) Field of Classification Search .................. 290/1 R, 290/4 R, 9; 322/89
See application file for complete search history.

(56) References Cited

U.S. PATENT DOCUMENTS

| | | | | |
|---|---|---|---|---|
| 1,861,750 | A * | 6/1932 | Mitzlaff | 318/148 |
| 3,859,578 | A * | 1/1975 | Botvinnik et al. | 318/732 |
| 4,114,555 | A * | 9/1978 | O'Brien, Jr. | 440/6 |
| 4,338,525 | A * | 7/1982 | Kilgore | 290/17 |
| 4,361,791 | A * | 11/1982 | Plunkett | 318/723 |
| 4,489,665 | A * | 12/1984 | Ayers | 110/250 |
| 4,661,714 | A * | 4/1987 | Satterthwaite et al. | 290/4 R |
| 4,709,203 | A * | 11/1987 | Roux et al. | 322/87 |
| 5,199,912 | A * | 4/1993 | Dade et al. | 440/6 |
| 5,684,690 | A * | 11/1997 | Levedahl | 363/178 |
| 5,793,178 | A * | 8/1998 | Biais | 318/700 |
| 5,847,470 | A * | 12/1998 | Mitchell | 290/45 |
| 6,150,731 | B1 * | 11/2000 | Rinaldi et al. | 290/1 A |
| 6,175,163 | B1 * | 1/2001 | Rinaldi et al. | 290/6 |
| 6,188,139 | B1 * | 2/2001 | Thaxton et al. | 290/4 R |
| 6,239,513 | B1 * | 5/2001 | Dean et al. | 307/64 |
| 6,242,881 | B1 * | 6/2001 | Giordano | 318/700 |

(Continued)

FOREIGN PATENT DOCUMENTS

DE     1932929     * 7/1969

*Primary Examiner* — Pedro J Cuevas
(74) *Attorney, Agent, or Firm* — Dennison, Schultz & MacDonald

(57) ABSTRACT

Propulsion system for ships and other mobile marine structures, with a driving machine for running an electrical generator, which is further connected to an electrical propulsion motor with connection to a propeller or similar propulsion device. The system can be simplified in that the generator and the propulsion motor are permanently magnetized synchronous machines. The two synchronous machines have substantially the same basic construction, with approximately identical voltage characteristics with regard to frequency, and they are directly connected together with a rigid electrical connection.

18 Claims, 1 Drawing Sheet

U.S. PATENT DOCUMENTS

| | | | |
|---|---|---|---|
| 6,957,990 B2 * | 10/2005 | Lowe | 440/6 |
| 7,154,192 B2 * | 12/2006 | Jansen et al. | 290/55 |
| 7,309,929 B2 * | 12/2007 | Donnelly et al. | 290/4 R |
| 7,369,417 B2 * | 5/2008 | Morcov et al. | 363/3 |
| 7,544,108 B2 * | 6/2009 | Rzadki et al. | 440/6 |
| 7,573,144 B1 * | 8/2009 | Saban et al. | 290/4 R |
| 7,576,443 B2 * | 8/2009 | Raju | 290/40 F |
| 7,710,081 B2 * | 5/2010 | Saban et al. | 322/89 |
| 7,960,948 B2 * | 6/2011 | Saban et al. | 322/89 |
| 7,969,044 B2 * | 6/2011 | Armstrong et al. | 307/86 |
| 8,076,881 B1 * | 12/2011 | Hall et al. | 318/400.2 |
| 2008/0103632 A1 * | 5/2008 | Saban et al. | 700/286 |
| 2009/0140576 A1 * | 6/2009 | Yu et al. | 307/66 |
| 2009/0200809 A1 * | 8/2009 | Saban et al. | 290/4 R |
| 2011/0037442 A1 * | 2/2011 | Tormanen et al. | 322/44 |
| 2011/0241578 A1 * | 10/2011 | Kim et al. | 318/400.02 |

* cited by examiner

PROPULSION SYSTEM FOR SHIPS

This application is a filing under 35 USC 371 of PCT/NO2004/000253 filed Aug. 27, 2004.

BACKGROUND OF THE INVENTION

The invention relates to a propulsion system, for the propulsion (propulsion and positioning) of ships and other mobile marine structures.

DESCRIPTION OF RELATED ART

Background

Diesel-electric propulsion has been popular for a while, especially for offshore vessels. One of the reasons for this is that the installation of the machinery is flexible, and permits cargo and tools to be placed where desired.

There exists multiple proposals for the electric propulsion of ships. It is for instance known to connect several generators in parallel, for supplying to a network. This makes it possible to place smaller units in free spaces in the ship, but will increase the initial costs. The propulsion motors have been connected to this network through power electronics convertors, which permits control of the rotational speed. The alternative to this is to use a mechanical gear between the propulsion motor and the propeller. Both alternatives will increase the initial costs, and reduce the power efficiency. Furthermore, such equipment will require maintenance, and implies risk of failures.

It is also known to install a larger generator to a driving machine. If this is connected to a network with fixed frequency, the driving machine must run with a high rotational speed, independently of the load.

To control the rotational speed by means of a network with fixed frequency, power electronics that can feed the propulsion motor with both variable amplitude and variable frequency is required. Such an installation provides good torque control and efficient propeller control, but represents an increased investment. In addition, the losses in the converter becomes substantial. Problems with harmonic resonance in the network necessitates cost-increasing measures with generators and the network as such.

An additional disadvantage resides in increased propellant expenses, especially with the use of a diesel engine which must run with a high, fixed rotational speed. This has resulted in the traditional diesel-electric propulsion system with power electronics, in spite of its favourable control qualities, competing poorly with traditional directly running diesel engines when it comes to propellant economy.

From published German document 1 932 929 (Siemens 1971), it is known to connect a synchronous generator, which is driven by a combustion engine, to two synchronous engines, one directly, and the other through an electrical speed governor. This solution is not suitable for installations where a generator shall run a single motor.

From PCT-application WO 03/047963 (Siemens 2003) known is a gas turbine-driven synchronous generator, where an extensive control system is required to connect the gas turbine directly to the generator. This installation does not provide a simple solution for the interconnection of a generator and a propulsion motor for a propeller.

From Japanese patent application 62079764 (Yokogawa Electric Corp. 1988) a generator-motor-unit for the running of a ship propeller is known, where a control circuit is connected between the generator and the motor, for controlling the rotational speed. This requires an additional unit, increasing the cost.

SUMMARY OF THE INVENTION

The main object of the invention is to provide a propulsion installation that reduces the investment, space requirements, maintenance expenses, running expenses, and the risk of failure during use. Simultaneously the possibility to vary the rotational speed of the propeller within a certain range, as well as its direction of rotation, is desired.

The invention includes a driving machine for the running of an electric generator, which furthermore is connected to an electric motor with connection to a propeller or similar propulsion device. The generator and the propulsion motor are permanent magnet synchronous machines with substantially the same operating characteristics. They are directly connected together with a rigid electric connection.

It is proposed to use a slow moving multipolar motor with permanent magnets. In this way, the need for gearing can be avoided. For controlling the rotational speed, the propulsion motor is connected directly to a generator of variable frequency. Variation in the generator frequency is achieved by altering the rotational speed of the driving machine, such as a diesel engine.

In this way the rotational speed of the propeller can be changed without the use of power electronics, and reduced without gears. This reduces the investment and also the requirement for space. The most important advantage will, in some cases, be the savings in propellant consumption. This applies especially for ships that often move with reduced velocity, and with alternating power requirements for the propeller, such as trawlers, and other fishing boats, supply ships, and tugboats.

The invention makes it possible to reduce the rotational speed of the diesel engine by using a propulsion motor with a higher number of poles than the generator, so that a lossless transmission is provided.

Because the generator is a synchronous machine, the frequency of the current and voltage out of the generator will be determined by the rotational speed of the generator, i.e. the diesel engine. The motor will rotate synchronously with the generator. This means that one can control the rotational speed of the propeller with the rotational speed of the engine. By having different numbers of poles on the motor and generator, the rotational speed of the propeller can be altered with an "electric gear".

The output will be a third degree function of the rotational speed, because the torque is a second degree function of the rotational speed. Hence, the output supplied to the propeller shaft can be controlled without the use of power electronics converters. This is advantageous for vessels, and operating modes, with alternating output requirements. This may be the case for fishing boats, supply ships, tugboats, etc.

Additional features of the invention will appear from the dependent claims and the following example description.

BRIEF DESCRIPTION OF THE DRAWINGS

The invention is described below, with reference to the drawings, where

FIG. 1 schematically illustrates an installation for the propulsion of a ship, including an embodiment of the invention, while

DESCRIPTION OF THE PREFERRED EMBODIMENTS

Figure 1:
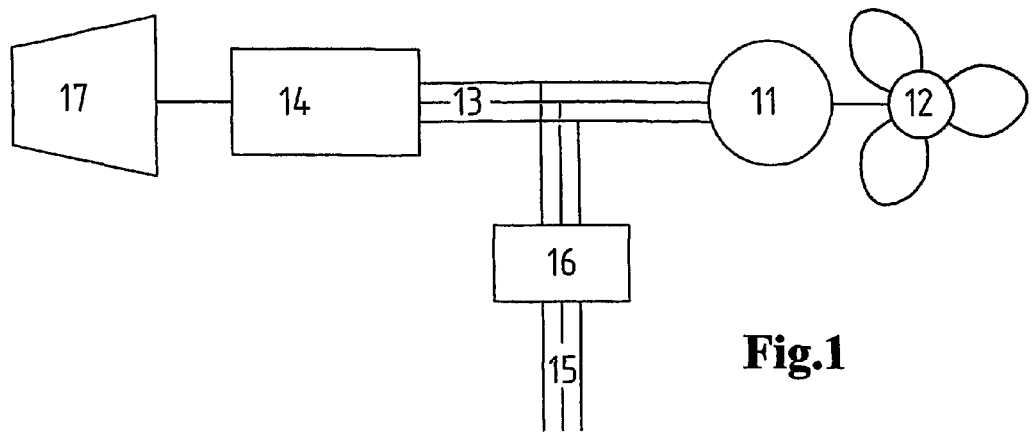

FIG. 1 shows a propulsion motor 11 for operating a propeller 12, which is connected directly to the motor, or possibly over an inserted intermediate shaft. The propulsion motor 11 is fed from a three-phase connection 13 from a generator 14. From the three-phase connection 13, current is branched off to a consumption network 15, through a frequency converter 16. The consumption network 15 may include the usual electrical consumption equipment on the boat, such as that used in the operation of supply ships, or factory trawlers. The frequency converter 16 can be a motor-generator-set with power electronics.

The generator 14 is run by a driving machine 17, which can be any speed-adjustable combustion engine, such as a gas turbine or diesel engine.

The generator 14 is a synchronous machine with permanent magnets. It can have a relatively high rotational speed and few poles. This provides the possibility of making damper windings. At its optimal operating point, such a generator will have a higher efficiency than a synchronous machine with field windings.

Such a permanently magnetized generator may, for instance, have six poles. It will then yield 50 Hz at 1000 RPM.

In the example, the propulsion motor 11 is constructed with a higher number of poles, for instance 24, so that a reduction gearing for the rotational speed of the driving machine 17 is achieved. With such dimensioning, engine rotation is reduced losslessly by 4:1. The generator 14 and the propulsion motor 11 have mainly the same operational characteristics.

It is also possible to use a synchronous motor with field windings, but this will have lower efficiency and require a magnetizing current, and thereby an auxiliary current supply.

When starting up a synchronous generator with permanent magnets, the voltage will rise with the rotational speed. This means that the voltage will be above the rated voltage, at rated rotational speed, when the generator is not loaded.

A permanently magnetized synchronous motor with a high number of poles cannot normally be started by being connected directly to a generator in operation. To manage this, the propulsion motor 11 can be supplied with damper windings, which gives it asynchronous characteristics in the starting phase. The lower torque which this implies, will not have particularly negative effect for propeller propulsion. Since the output is proportional with the third power of the rotational speed, the power requirement at start-up will be modest.

Figure 2:
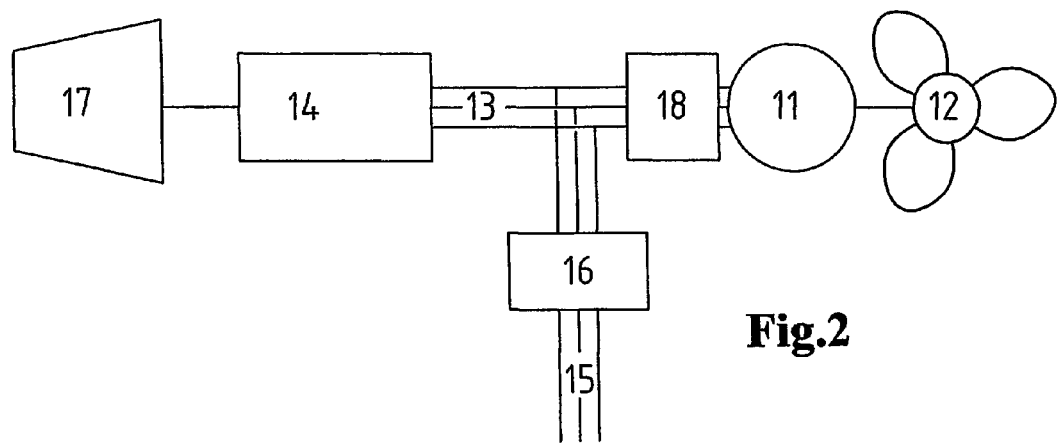
FIGS. 2 and 3 illustrate alternative embodiments.

FIG. 2 shows an alternative form of embodiment where the propulsion motor is connected to an auxiliary converter 18, which is used for controlling the start and rotational direction. The driving machine 17 is then run with reduced rotational speed, for instance about half speed, and synchronizing from reduced frequency will be performed. The synchronizing occurs by parallel coupling of the auxiliary converter and the generator.

The intercoupling of the generator and the propulsion motor will be strongest at the rated rotational speed, and will be more likely to be put out of synchronism at reduced rotational speeds of the driving machine. However, this will be an acceptable problem for propeller propulsion.

In the shaft connection between the driving machine 17 and the generator 14, a damping element may be inserted, such as torsional fluctuation dampers which may be hydraulic, which reduces strokes from the driving machine, for instance from the piston strokes of a diesel engine.

It is also possible to apply damper windings in the generator 14, which have more space between the poles. Such damper windings will have a damping effect on the propulsion motor 11 as well.

The permanently magnetized units 11 and 14 can have the permanent magnets mounted on the surface of the rotor sheet and have a relatively large air gap, or can have the permanent magnets mounted in the inner of the rotor, thus reducing the air gap. For machines with permanent magnets, the rotor sheet can be replaced by a ring-shaped yoke of massive steel.

A permanently magnetized generator, which has low reactance, will not be particularly sensitive to changes in the load, so a satisfactory cos fi and efficiency can be achieved.

The ratio between the numbers of poles in the generator and the motor can be from 3:1 to 1:20. The first may be relevant for operation of a water jet.

Figure 3:
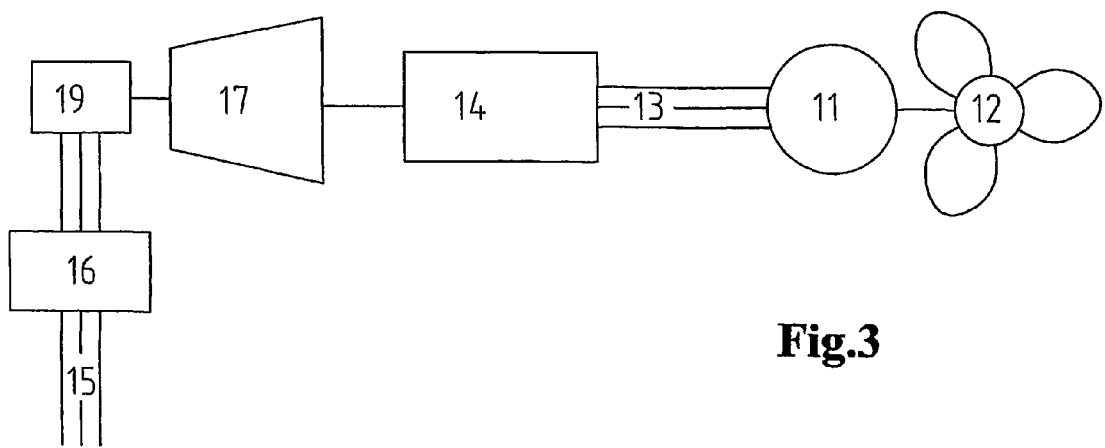

FIG. 3 shows an additional alternative embodiment, where current for consumption on the vessel is collected from a generator 19, which is connected to another take-off point on the driving machine 17. In the same way as the equipment in FIG. 1 is configured, the generator operates a frequency converter 16 for the network 15.

The electrical interconnection includes protection and contactors for connection and disconnection.

The invention claimed is:

1. A propulsion system for ships and other mobile marine structures, comprising:
    a driving machine having a mechanical rotating output;
    a generator comprising a permanently magnetized synchronous machine having a first number of poles;
    a propulsion motor comprising a permanently magnetized synchronous machine having a second number of poles;
    wherein the propulsion motor is configured so that it has essentially the same operating characteristics as the generator;
    a propulsion device;
    wherein the generator and the propulsion motor are directly connected by an electrical connection;
    wherein the generator is run by the driving machine;
    wherein the generator generates electricity of a frequency according to a rotational speed of the driving machine; and
    wherein rotation of the propulsion motor is synchronized with the generator;
    wherein the propulsion motor rotates at a speed according to the frequency of electricity supplied from the generator and causes the rotation of the propulsion device.

2. A propulsion system according to claim 1, wherein the ratio between the first number of poles and the second number of poles is 3:1 to 1:20.

3. A propulsion system according to claim 2, wherein the first number of poles is less than the second number of poles.

4. A propulsion system according to claim 1, wherein the output of the electrical generator is additionally connected to a branch circuit for feeding a consumption network, a frequency converter being provided between the output and the branch circuit to provide a stable frequency from the generator.

5. A propulsion system according to claim 1, additionally comprising an auxiliary generator powered by the driving machine for feeding a consumption network, a frequency converter being provided between the auxiliary generator and the consumption network.

6. A propulsion system according to claim 1, wherein the driving machine is a speed-adjustable combustion engine.

7. A propulsion system according to claim 6, wherein the engine is a diesel engine or gas turbine engine.

8. A propulsion system according to claim 1, wherein the generator has six poles, yielding 50 Hz at 1000 rpm.

9. A propulsion system according to claim 8, wherein the propulsion motor has 24 poles.

10. A propulsion system according to claim 1, further comprising a frequency converter that feeds a consumption network with stable frequency from the generator.

11. A propulsion system according to claim 1, further comprising an auxiliary generator which feeds a consumption network of the vessel through a frequency converter.

12. A propulsion system according to claim 1, further comprising:
- an auxiliary converter electrically connected to the generator and the propulsion motor;
- wherein electricity from the generator is supplied to the propulsion motor through the auxiliary converter when the rotational speed of the driving machine is reduced, and wherein synchronization of the propulsion motor from reduced frequency of electricity of the generator is carried out.

13. A propulsion system according to claim 1, wherein at least the propulsion motor comprises a permanently magnetized synchronous machine with a large number of poles; and wherein said propulsion motor comprises damper windings.

14. A propulsion system according to claim 1, wherein said damper windings which have more space between the poles are applied to the generator.

15. A propulsion system according to claim 1, wherein the ratio of said first number and second number of poles determines the ratio of the rotational speed of the propulsion device and the rotational speed of the driving machine.

16. A propulsion system according to claim 1, wherein the ratio of said first number and second number of poles determines the ratio of the rotational speed of the propulsion device and the rotational speed of the driving machine.

17. A propulsion system according to claim 1, wherein the first number of poles is the same as the second number of poles.

18. A propulsion system according to claim 1, wherein the first number of poles is greater than the second number of poles.

* * * * *